(No Model.) 4 Sheets—Sheet 4.
T. MERRELL.
CORN OR CANE HARVESTER.
No. 371,087. Patented Oct. 4, 1887.
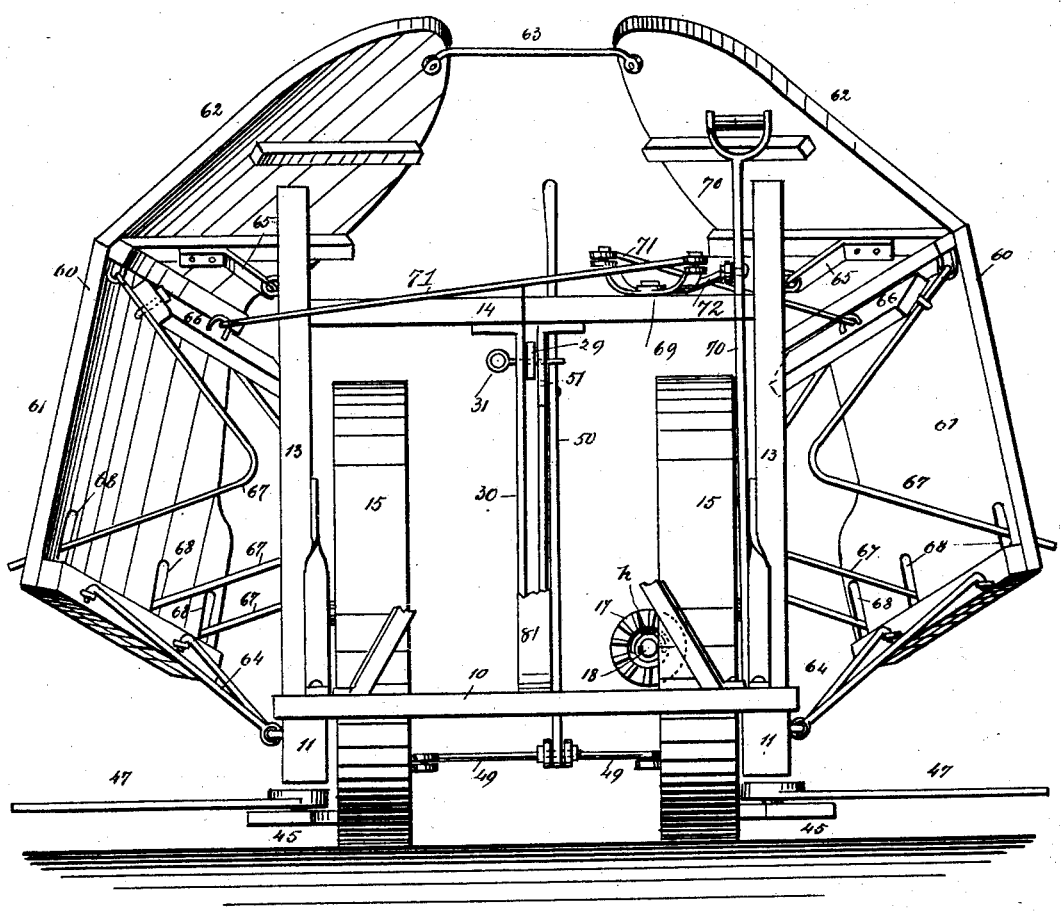
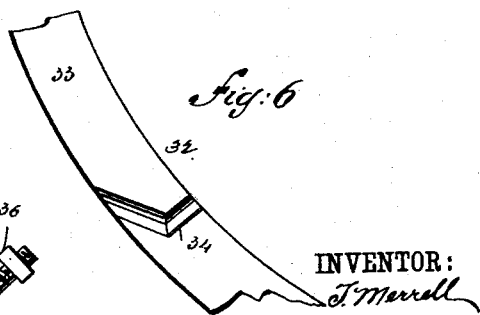
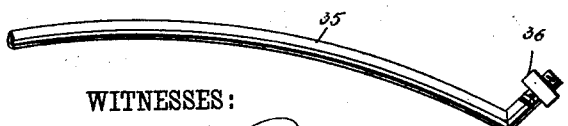
WITNESSES:
Chas. Nida
C. Sedgwick
INVENTOR:
T. Merrell
BY 
ATTORNEYS.

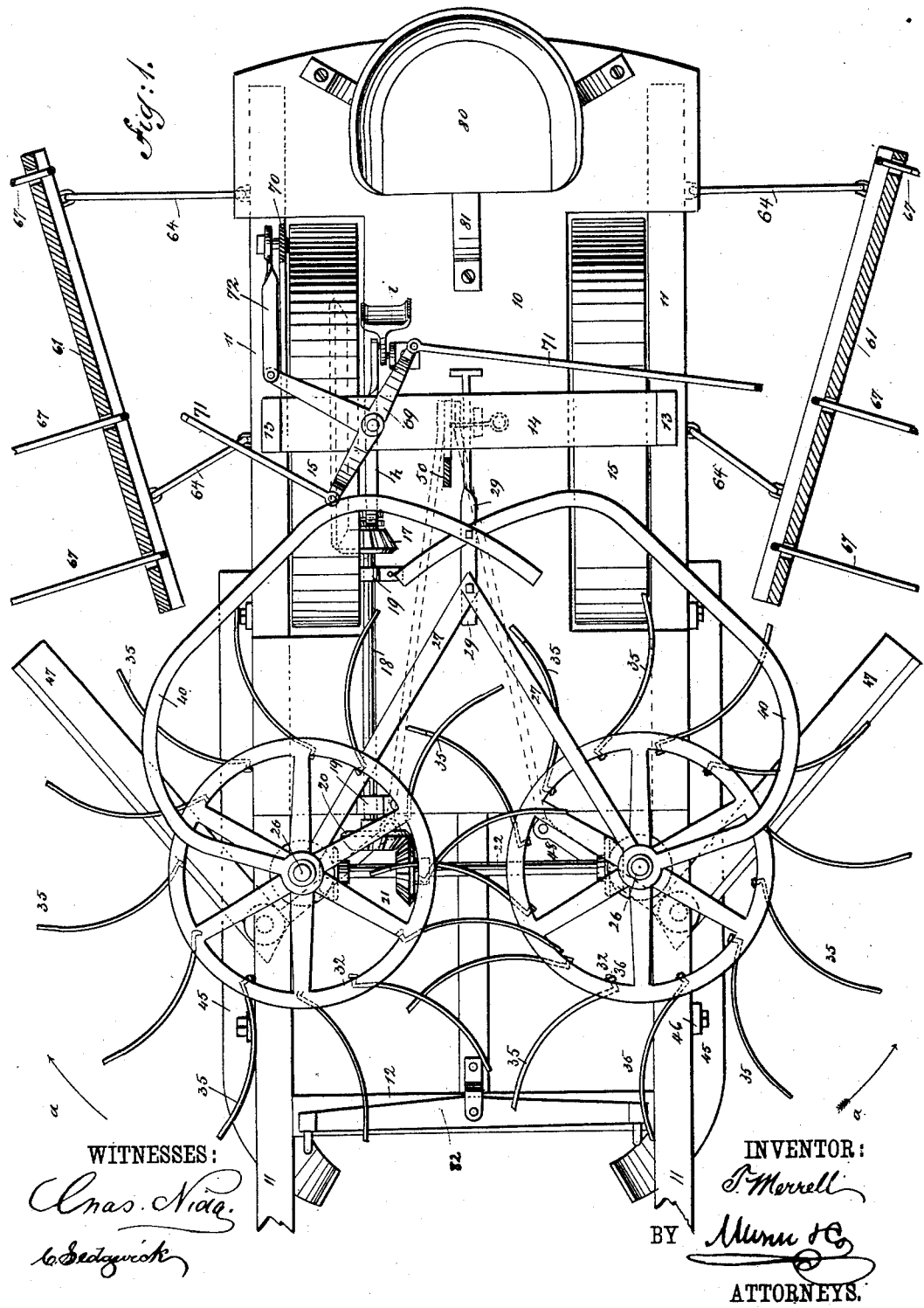

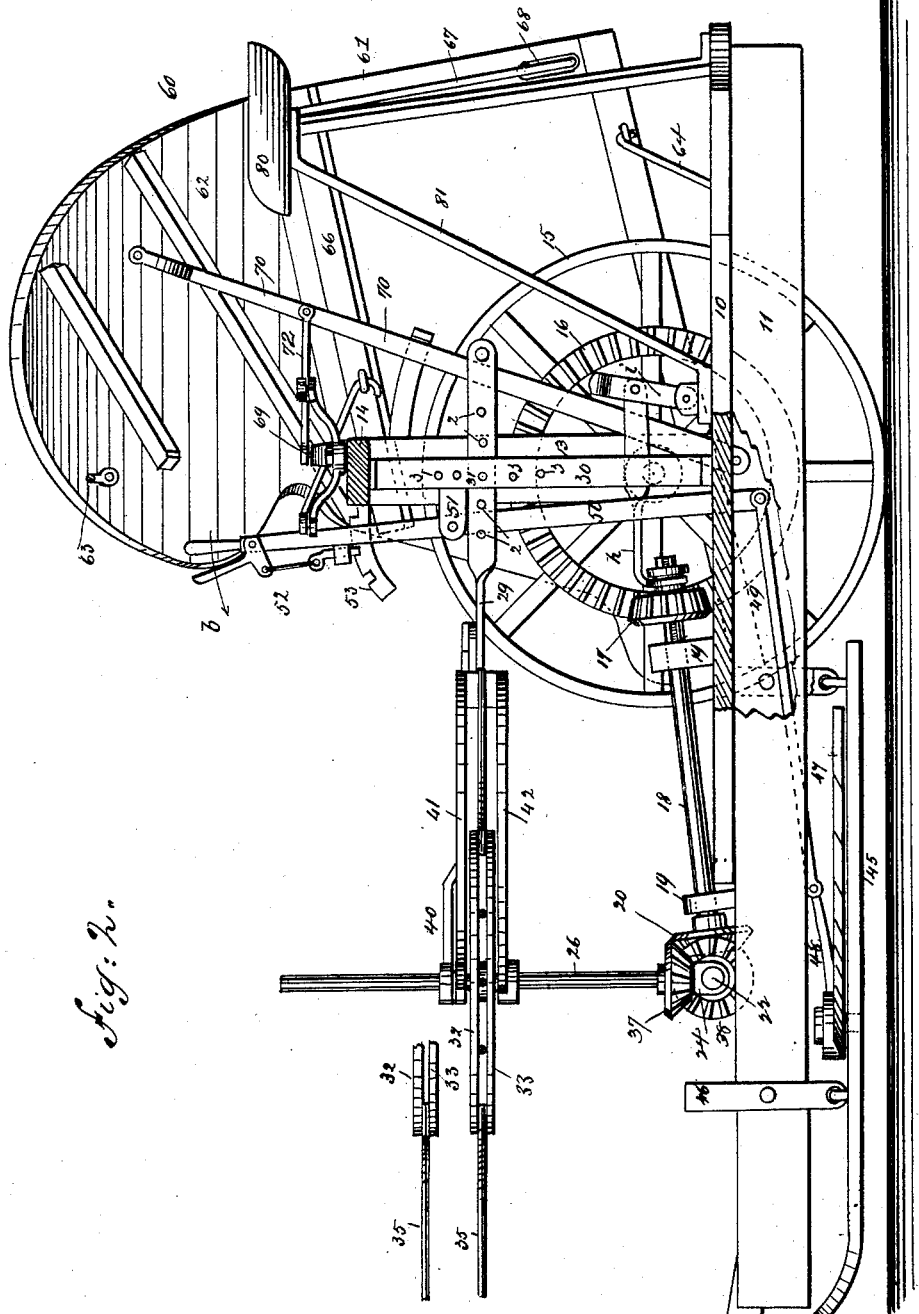

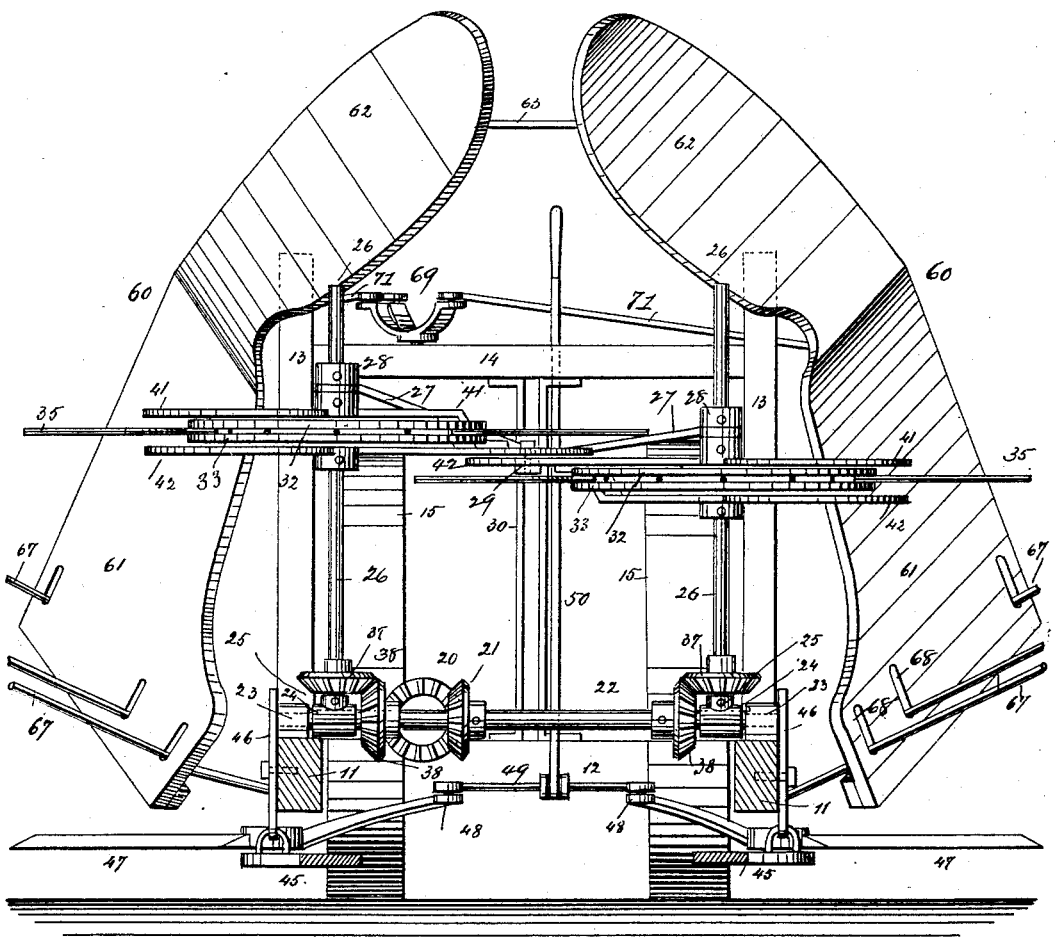

UNITED STATES PATENT OFFICE.

THEODORE MERRELL, OF DIXON, ILLINOIS.

CORN OR CANE HARVESTER.

SPECIFICATION forming part of Letters Patent No. 371,087, dated October 4, 1887.

Application filed December 17, 1886. Serial No. 221,852. (No model.)

*To all whom it may concern:*

Be it known that I, THEODORE MERRELL, of Dixon, in the county of Lee and State of Illinois, have invented a new and Improved Corn or Cane Harvester, of which the following is a full, clear, and exact description.

This invention relates to the construction of harvesters of the class illustrated, described, and claimed in Letters Patent No. 124,757, granted to me on the 19th day of March, A. D. 1872, and Letters Patent No. 133,327, granted to me on the 26th day of November, A. D. 1872; and the invention consists of the combinations of parts, including their construction, substantially as hereinafter set forth, and pointed out in the claims.

Reference is to be had to the accompanying drawings, forming a part of this specification, in which similar figures of reference indicate corresponding parts in all the views.

Figure 1 is a plan view of my improved form of corn or cane gatherer, the side-boards and the operating-levers being shown in horizontal section. Fig. 2 is a side view of the machine with one wheel and one side-board removed, certain parts being shown in section. Fig. 3 is a sectional elevation of the machine, taken on a line just behind the point at which the singletree is secured to the frame. Fig. 4 is a rear view of the machine, the seat, however, being removed. Fig. 5 is a detail view illustrating the construction of the fingers or gatherers, and Fig. 6 is a detail view showing a portion of one of the recessed rings within which the fingers are seated.

In the drawings, 10 represents the main platform of a machine, which platform is supported by two longitudinal sills, 11, that are united by cross-beams 12. The sills 11 carry two vertical posts or standards, 13, which serve as the supports for an upper cross-bar, 14, and to which the journals of the main supporting and driving wheels are secured, said driving-wheels being shown at 15. One of the wheels 15, preferably the one upon the right of the machine, carries a large bevel-gear, 16, and this gear 16 engages with a pinion, 17, that is carried by a forwardly-extending and downwardly-inclined shaft, 18, that is mounted in bearings 19, the forward end of the shaft 18 being provided with a gear, 20, that engages with a similar gear, 21, that is carried by a horizontal cross-shaft, 22, said shaft being mounted in bearings 23, that are carried by the sills 11.

The shaft 22 carries two sleeves, 24, that are formed with steps 25, said steps serving as the support for two vertical shafts, 26, the upper ends of said shafts being supported by rearwardly-extending bars 27, which bars are connected by means of sleeves 28 to the shafts 26, the rear ends of the bars being secured to a horizontal bar, 29, that is provided with apertures 2 toward its rear end, the side faces of the apertured portion of the bar being in vertical planes, while the side faces of the forward portion of the bar are in horizontal planes.

The rear portion of the bar 29 extends through a vertical slot that is formed in a vertical standard, 30, said standard being formed with apertures 3, that may be arranged to register with the apertures 2 of the bar 29, the bar being held in any required position by a pin, 31, which is passed through the registering-apertures of the standard and the bar.

To each of the shafts 26 there is rigidly connected a two-part wheel, 32, one wheel, however, being in a plane slightly above that occupied by the other, the wheels being held to their shafts by set-screws. In the lower section, 33, of each of the wheels 32, I form recesses 34, which recesses extend outward a short distance from the inner edge of the rim-section in radial lines, the recesses then being carried backward, in order that they may receive and support the gathering-fingers 35, which are formed so that they will extend outward from the wheels in curved lines, as clearly shown in Fig. 1, the ends of the fingers being threaded, in order that they may be engaged by nuts 36, by which nuts and upper section of the rim the fingers are held to place.

Each of the shafts 26 carries a gear, 37, and these gears 37 are engaged by gears 38, that are carried by the horizontal shaft 22, the arrangement being such that when the shaft 22 is revolved through the medium of its connections with the gear 16 the shafts 26 will be revolved, and in revolving will carry the wheels 32, and with said wheels the fingers 35 in the direction of the arrows shown at *a* in Fig. 1.

In connection with each set of fingers 35, I arrange guards 40, which guards consist of two outwardly-extending curved bars, 41 and 42, the bar 42 being loosely held to its shaft 26 below the wheel 32, while the bar 41 is loosely held to its shaft above the wheel 32, the two bars being united toward their rear ends, which rear ends are carried inward and over the bar 29, the rear ends of the two guards being pivotally connected to said bar 29. In revolving, the fingers 35 pass between the two sections of the guard 40, as clearly shown in Figs. 2 and 3.

To each of the sills 11, I connect a knife-plate, 45, said plates being held by strips 46, that are bolted to the sills, as indicated, and in practice I prefer to form each of the strips 46 with a number of apertures, so that the knife-plates 45 may be varied to meet the exigencies of the case.

Upon each of the knife-plates there is mounted a knife or sickle, 47, said knives 47 being provided with inwardly-extending lever-arms 48, which said lever-arms are connected by rods 49 with a lever, 50, that is pivotally mounted upon a bracket, 51, that extends outward from the standard 30, the upper end of the lever being provided with a thumb-latch, 52, that engages with a segmental rack, 53, that is secured to the cross timber or bar 14, the arrangement being such that when the lever is thrown in the direction of the arrow shown at *b* in Fig. 2 the knives 47 will be thrown outward to a cutting position. When the lever is thrown in the opposite direction, the knives will be withdrawn, so as to rest above the plates 45.

To the rear of the knives and of the mechanism above described I mount two fenders or shields, 60, which consist of lower and slightly inwardly-inclined portions, 61, and upper portions, 62, that are arranged at angles of about forty-five degrees, the sections 62 being united by a cross rod or bar, 63. These leaves or guards are connected to the main frame of the machine by stay-rods 64 and 65, the position of said stay-rods being best shown in Fig. 4.

To the under side of each of the fenders or shields there is hinged a cross-strip, 66, which strip carries a series of supporting-fingers, 67, said fingers being arranged to extend outward through slots 68, that are formed in the fenders or shields. Each of the strips 66 is connected by a rod, 71, with one of the arms of a tri-armed lever, 69, said lever being pivotally mounted upon the cross bar 14, while the other arm of the lever is connected with a vertical lever, 70, by means of a connecting-rod, 72, the lever 70 being pivotally connected to one of the sills 11, as best shown in Fig. 2. The seat 80 is supported by a tripod, 81, as best shown in Figs. 1 and 2.

The machine described is designed to be drawn by a single horse or mule, the animal being hitched to the singletree 82.

When the machine is in operation the rotation of the wheels 15 will, through the medium of the intermediate connections, cause the shafts 26 to revolve, and in revolving the fingers 35, carried by said shafts, will gather the corn or cane upon either side of the path of the machine, the knives or sickles 47 being at this time extended and in position to cut the stalks close above the ground. After the stalks are cut they are carried backward by the fingers 35 onto the fingers 67, where they are supported until a sufficient number of stalks have been gathered. Then the lever 70 is thrown and the fingers 67 are drawn inward to the position in which they are shown in Fig. 4, the load being thereby dropped upon the ground.

By forming the upper sections of the fenders or shields 60 so that they flare inward, I prevent tall stalks from falling upon and interfering with the movements of the operating mechanism of the machine; and by providing the cross-brace rod 63, I prevent all undue vibration of the two fenders or shields, and secure a rest for the lines.

In order that the pinion 17 may be thrown into and out of engagement with the gear 16, I mount said gear so that it will slide longitudinally upon the shaft 18, said shaft being provided with a feather, as shown, and I form the pinion itself with a grooved hub that is engaged by the bifurcated end of a link, *h*, that is connected to a foot-lever, *i*, as best shown in Fig. 2, so that by moving the lever *i* forward the pinion 17 will be thrown from engagement with the gear 16; but the said engagement may be re-established by moving the lever *i* to the position in which it is shown in Fig. 1.

Having thus fully described my invention, I claim as new and desire to secure by Letters Patent—

1. In a corn-harvesting machine, the combination, with a gathering and cutting mechanism, of the broad backwardly-flaring fenders or shields located at the sides of the machine, and extending upward and inclined inward and having their upper parts of greater inclination inward than their lower parts, so that their upper ends project over the supporting-wheels to prevent the severed and falling stalks coming in contact therewith, a cross-rod connecting the upper ends of the fenders together, and rods connecting the lower ends of said fenders with the main frame of the machine, substantially as and for the purpose set forth.

2. In a corn-harvesting machine, the combination, with a gathering and cutting mechanism, of the broad backwardly-flaring fenders located at the sides of the machine and extending upward and inclined inward, and having their upper parts of greater inclination inward than their lower parts, so that their upper ends project over the supporting-wheels and proximately overhang the center of the machine, a cross-rod connecting the upper ends of the fenders together, rods connecting the lower ends of the fenders with the frame of the machine on opposite sides thereof, and a tri-armed lever having two of its arms linked with the supporting-fingers by means of hinged cross strips and its third arm connected with a hand-lever, substantially as and for the purpose specified.

3. In a corn-harvesting machine, the combination, with the cutting mechanism, of the reels, each having a sectional rim with one rim-section provided with recesses which extend outward a short distance from the inner edge of the rim-section on radial lines and thence to the edge at angles with the radial arms, and the fingers adapted to fit at their inner ends in said recesses, substantially as and for the purpose set forth.

THEODORE MERRELL.

Witnesses:
   CHARLES B. MORRISON,
   WILBUR P. BRIGGS.